United States Patent
Ko (10) Patent No.: US 7,690,038 B1
(45) Date of Patent: Mar. 30, 2010

(54) NETWORK SECURITY SYSTEM WITH AUTOMATIC VULNERABILITY TRACKING AND CLEAN-UP MECHANISMS

(75) Inventor: Simon C. Ko, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 1373 days.

(21) Appl. No.: 11/115,694

(22) Filed: Apr. 26, 2005

(51) Int. Cl.
H04L 29/14 (2006.01)
(52) U.S. Cl. ...................................................... 726/24
(58) Field of Classification Search .................. None
See application file for complete search history.

(56) References Cited

U.S. PATENT DOCUMENTS

| | | | |
|---|---|---|---|
| 5,442,699 | A | 8/1995 | Arnold et al. |
| 5,452,442 | A | 9/1995 | Kephart |
| 5,907,834 | A | 5/1999 | Kephart et al. |
| 6,192,512 | B1 | 2/2001 | Chess |
| 6,279,128 | B1 | 8/2001 | Arnold et al. |
| 6,622,134 | B1 | 9/2003 | Sorkin |
| 6,711,583 | B2 | 3/2004 | Chess et al. |
| 6,757,830 | B1 * | 6/2004 | Tarbotton et al. ........... 713/188 |
| 6,785,732 | B1 * | 8/2004 | Bates et al. .................. 709/232 |
| 6,789,200 | B1 | 9/2004 | Fiveash et al. |
| 6,813,712 | B1 | 11/2004 | Luke |
| 7,152,164 | B1 * | 12/2006 | Loukas ........................ 713/188 |
| 2004/0255167 | A1 * | 12/2004 | Knight ........................ 713/201 |
| 2005/0251862 | A1 * | 11/2005 | Talvitie ....................... 726/24 |

FOREIGN PATENT DOCUMENTS

| | | |
|---|---|---|
| EP | 1 377 892 B1 | 9/2004 |
| WO | WO 02/084459 A1 | 10/2002 |

OTHER PUBLICATIONS

"A New Antivirus Tool for Network Administrators-ePolicy Orchestrator", Interface Online, Sep. 2001.*
"White Paper—Trend Micro Control Manager: Centralized Antivirus Management", Trend Micro, Mar. 2002.*
Evaluation Guide—Trend Micro OfficeScan Corporate Edition 5.5, Trend Micro, Inc., Jan. 2003, Retrieved from the Internet on May 20, 2009: <URL: http://www.trendmicro.com/NR/rdonlyres/7D522161-C6AE-4062-A05B-5A32C66694FA/9470/osce55evalguide_lowres.pdf>.*
Oliveri, Trend Micro OfficeScan Corporate Edition, Jun. 2003, Retrieved from the Internet on May 20, 2009: <URL: http://www.net-security.org/review.php?id=78>.*
Technical Paper—Argon Client Management Services (CMS) and Virus Scanning, 2002, Argon Technology Corporation, Retrieved from the Internet on May 20, 2009: <URL: http://registration.argontechnology.com/cms/ATC-CMS-VS.pdf>.*

* cited by examiner

*Primary Examiner*—Minh Dinh
(74) *Attorney, Agent, or Firm*—Okamoto & Benedicto LLP (57) ABSTRACT

In one embodiment, an antivirus system logs in-transit e-mails in a computer network. Upon receipt of an updated pattern file for an antivirus scan engine, the log may be checked to determine if the computer network has been exposed to a computer virus identified in the updated pattern file. If so, antivirus actions, such as antivirus scanning of a client computer that has been infected by the virus, may be remotely initiated.

19 Claims, 5 Drawing Sheets

NETWORK SECURITY SYSTEM WITH AUTOMATIC VULNERABILITY TRACKING AND CLEAN-UP MECHANISMS

BACKGROUND OF THE INVENTION

1. Field of the Invention

The present invention relates generally to computer network security, and more particularly but not exclusively to antivirus systems.

2. Description of the Background Art

Computer viruses, worms, Trojans, and spyware are examples of malicious codes that have plagued computer systems throughout the world. Although there are technical differences between each type of malicious code, malicious codes are commonly collectively referred to as "viruses." For example, commercially available "antivirus software" is designed to scan a computer for viruses as well as worms and other malicious codes. Antivirus software typically includes a scan engine and a pattern file. The pattern file includes signatures of known viruses. To scan a file for viruses, the scan engine compares the contents of the file to signatures of viruses identified in the pattern file. The pattern file is periodically updated to include signatures of newly discovered viruses.

Computers belonging to a computer network may receive data from computers outside the network. While inter-network data transfers advantageously allow for rapid exchange of information, it also allows viruses to rapidly spread from one computer network to another. To minimize possible damage in the event of a virus outbreak, it is important for a network administrator to quickly assess the vulnerability of the computer network so that corrective or preventive actions may be performed in time. Currently, there is no effective means of automatically determining the vulnerability of a computer network.

SUMMARY

In one embodiment, an antivirus system logs in-transit e-mails in a computer network. Upon receipt of an updated pattern file for an antivirus scan engine, the log may be checked to determine if the computer network has been exposed to a computer virus identified in the updated pattern file. If so, antivirus actions, such as antivirus scanning of a client computer that has been infected by the virus, may be remotely initiated.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. For example, although embodiments of the invention are described in the context of electronic mail messages, the invention is equally applicable to data transfers in general. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
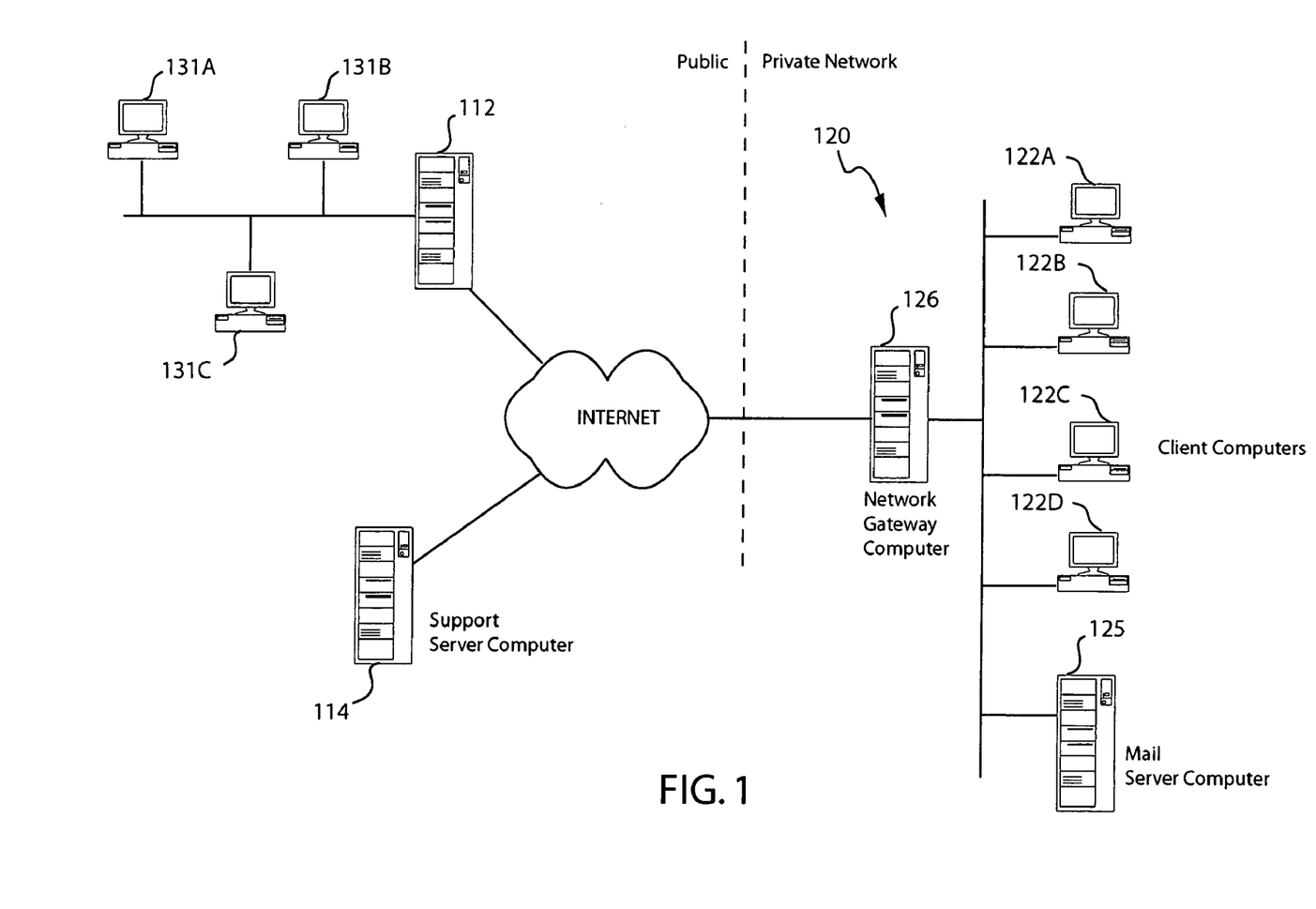
FIG. 1 schematically shows an example computing environment in accordance with an embodiment of the present invention.

FIG. 1 schematically shows an example computing environment in accordance with an embodiment of the present invention. In the example of FIG. 1, a private computer network 120 includes a network gateway computer 126, a mail server computer 125, and client computers 122 (i.e. 122A, 122B, 122C, ... ). The client computers 122 may be desktop computers, for example. The network gateway computer 126 couples the network 120 to a public network, which in the example of FIG. 1 includes the Internet. This allows computers in the network 120 to communicate with computers outside the network. For example, a client computer 122A may receive an electronic mail message ("e-mail") from a client computer 131B. In the example of FIG. 1, the client computer 131B belongs to another computer network that includes a client computer 131A, a client computer 131C, and a server computer 112 (e.g., a gateway computer).

The mail server computer 125 may comprise a server computer configured to provide e-mail services to computers in the network 120. The mail server computer 125 may include a mail server configured to communicate with an e-mail client in a client computer 122. The mail server computer 125 receives e-mails entering the network 120 and forwards each e-mail to its destination e-mail client in a client computer 122. Similarly, a user on a client computer 122 may compose and send an outgoing e-mail using an e-mail client. The outgoing e-mail is received by the mail server computer 125, which then forwards the outgoing e-mail to its destination within or beyond the network 120.

As will be more apparent below, a client computer 122 may include antivirus software as a security measure against computer viruses. The antivirus software may include a scan engine and a pattern file. The antivirus software may be supported by an antivirus research and support center, such as the TrendLabs™ global antivirus research and support center operated by Trend Micro, Inc. An antivirus research and support center watches for virus outbreaks and prepares virus "antidotes" in the form of pattern files. In the example of FIG. 1, a support server computer 114 comprises a server computer of an antivirus research and support center that supports antivirus software in the network 120. Computers in the network 120 may periodically receive updated pattern files from the support server computer 114 over the Internet.

Figure 2:
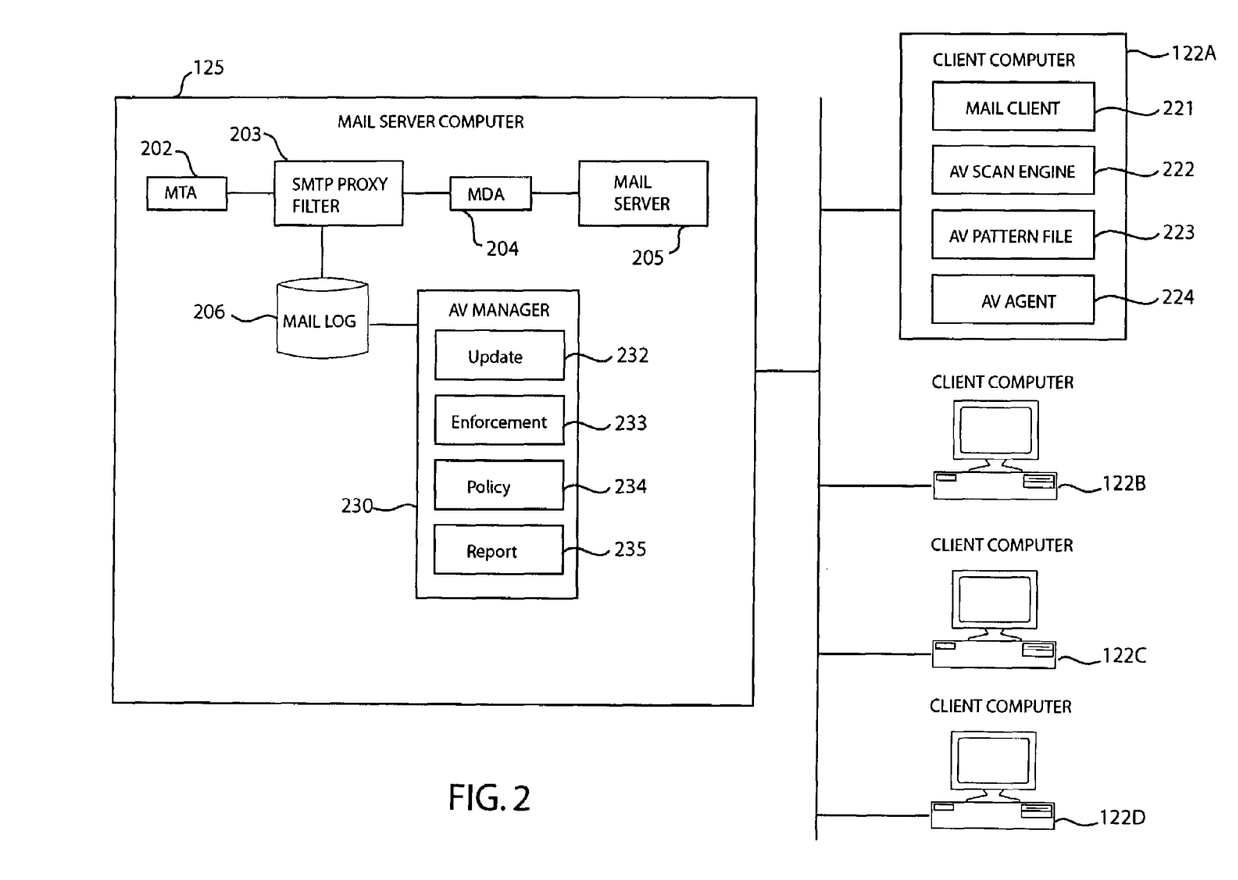
FIG. 2 schematically shows the components of the mail server computer and the client computers of FIG. 1, in accordance with an embodiment of the present invention.

FIG. 2 schematically shows the components of the mail server computer 125 and the client computers 122, in accordance with an embodiment of the present invention. The mail server computer 125 may include a mail transfer agent 202, a Simple Mail Transfer Protocol (SMTP) proxy filter 203, a mail delivery agent 204, a mail server 205, a mail log 206, and an antivirus manager 230. In the example of FIG. 2, the aforementioned components are located in a single mail server computer 125 for clarity of illustration. As can be appreciated, the components of the mail server computer 125 may also be distributed among two or more computers. For example, the mail server 205 may be running in a server computer separate from, but in communication with, the mail server computer 125. The components of the mail server computer 125 may also be integrated in one or more combined modules. For example, the mail transfer agent 202, the proxy filter 203, the mail delivery agent 204, and the antivirus manager 230 may be integrated with the mail server 205.

A mail server 205 may comprise a conventional mail server, such as the Microsoft Exchange™ mail server, for example. In the example of FIG. 2, e-mails destined for the mail server 205 is first processed by the mail transfer agent 202, the proxy filter 203, and the mail delivery agent 204.

In one embodiment, the mail transfer agent 202 comprises computer-readable program code for receiving in-transit e-mails destined to be processed by the mail server 205. The mail transfer agent 202 may comprise the so-called "Postfix" mail server, for example. The mail transfer agent 202 may be configured to listen to port 25, which is the Internet standard port for receiving SMTP e-mails. This transparently allows in-transit e-mails to be processed by the proxy filter 203 prior to being received by the mail server 205.

In one embodiment, the proxy filter 203 comprises computer-readable program code for extracting information from an e-mail. In the example of FIG. 2, the proxy filter 203 is configured to read e-mails conforming to SMTP. The proxy filter 203 may also be configured to read e-mail conforming to other mail transfer protocols depending on the application. The mail transfer agent 202 forwards e-mails to the proxy filter 203. The proxy filter 203 may parse each e-mail for (a) address information, such as recipient and sender names and addresses; (b) message in the subject line; and (c) information about files attached with the e-mail. For example, the proxy filter 203 may determine the name, type (e.g., executable, graphics, audio), and header information of each attached file. The proxy filter 203 may then create a record of each e-mail. Preferably, each e-mail record comprises a relatively small amount of essential information that may be readily saved without running into storage and processing resource issues. In one embodiment, the proxy filter 203 creates a record, also referred to as "e-mail record," with the following information for each e-mail.

a) name of recipient ("from field" of the e-mail);
b) network address of recipient;
c) name of sender ("from field" of the e-mail);
d) network address of sender;
e) file name, including extension (.exe, gif, etc.) of attached files; and
f) headers (e.g., header of an archive file) of attached files.

As can be appreciated, the just-described example e-mail record consists only of text data and thus has minimal storage and processing requirements. That is, copies of the attached files themselves and other storage-intensive data are preferably not included in the e-mail record. As will be more apparent below, this advantageously allows relatively large amounts of e-mails to be logged for automatic vulnerability assessment in the event of a virus outbreak.

In one embodiment, the proxy filter 203 logs each e-mail it receives from the mail transfer agent 202. The proxy filter 203 may do so by creating an e-mail record for each e-mail and saving each e-mail record in the mail log 206. Mail log 206 may comprise a database, table, or other data storage and retrieval mechanism in a storage device, such as volatile memory (e.g. RAM for temporary storage), non-volatile memory (e.g. hard disk for long term storage) or combination thereof.

The mail delivery agent 204 may comprise computer-readable program code for forwarding e-mails to the mail server 205. After logging an e-mail in the mail log 206, the proxy filter 203 forwards the e-mail to the mail server 205 using the mail delivery agent 204. Like the mail transfer agent 202, the mail delivery agent 204 may comprise computer-readable program code, such as the Postfix mail server.

The antivirus manager 230 may comprise computer-readable program code for receiving pattern files from the support server computer 114, for automatically making vulnerability assessments in the event of a virus outbreak, and for automatically initiating antivirus actions based on configurable policies. The antivirus manager 230 together with an antivirus scan engine 222, an antivirus pattern file 223, and an antivirus agent 224 in the client computers 122 form an antivirus system for securing the network 120 from viruses.

In the example of FIG. 2, the antivirus manager 230 comprises an update module 232, an enforcement module 233, a policy list 234, and a report module 235. In one embodiment, the update module 232 comprises computer-readable program code for requesting and receiving pattern files from the support server computer 114 over the Internet. The support server computer 114 sends out updated pattern files when a new virus is discovered or for maintenance reasons. The update module 232 receives updated pattern files from the support server computer 114 and forwards them to antivirus agents 224 running in the client computers 122. An antivirus agent 224 receives an updated pattern file from the update module 232 and facilitates replacement of an old pattern file with the new, updated pattern file.

A pattern file includes signatures of known viruses. A pattern file may also include information for identifying and removing known viruses. For example, a pattern file may include information as to characteristics of a virus, such as its name or the name of its host file, subject or address information of e-mails likely to contain the virus, header information of files likely to contain the virus, and so on. Whenever the update module 232 receives an updated pattern file from the support server computer 114, the update module 232 may check the updated pattern file for new viruses. For example, the update module 232 may look for viruses identified in the updated pattern file but not in the old pattern file. If a new virus exists, the update module 232 may automatically initiate a vulnerability assessment using the report module 235 to determine exposure of the network 120. Based on the vulnerability assessment, the update module 232 may initiate antivirus actions using the enforcement module 233. For example, the enforcement module 233 may remotely initiate antivirus scanning of a client computer 122 deemed to have been infected by the new virus.

The report module 235 may comprise computer-readable program code for generating a vulnerability assessment report. The vulnerability assessment report may comprise information indicative of the exposure of a network to a security threat, such as a virus. The vulnerability assessment report may be in a computer-readable format (e.g., as a data structure) that allows for rapid reading by the update module 232. In one embodiment, the vulnerability assessment report indicates the extent the network 120 has been exposed to a particular virus. Upon identification of a newly discovered virus in an updated pattern file, the update module 232 may send a command to the report module 235 to query the mail log 206 to determine if any e-mail that has entered the network 120 carries the new virus. The report module 235 may go through each e-mail record in the mail log 206 to identify the presence of the new virus in a logged e-mail. For example, if the new virus has a particular file name, the report module 235 may go through each e-mail record to determine if a file bearing the particular file name has entered the network 120 as an e-mail attachment. As another example, if the new virus is known to be carried by e-mails having a particular subject line, the report module 235 may go through each e-mail record to look for a logged e-mail having the subject line. In general, characteristics of the new virus identified in the pattern file may be matched by the report module 235 to those of e-mails having corresponding e-mail records in the mail log 206. The report module 235 may generate a vulnerability assessment report identifying e-mails that may have carried the new virus, and the address information of those e-mails (from information in the e-mail record) for subsequent antivirus action. For example, the vulnerability assessment report may identify the e-mails infected by the new virus and report all or part of the e-mail record for each of the infected e-mails.

In one embodiment, the enforcement module 233 comprises computer-readable program code for performing antivirus actions. When a vulnerability assessment report from the report module 235 indicates that the network 120 has been exposed to a new virus, the update module 232 may pass all or portions of the report to the enforcement module 233. The enforcement module 233 may perform antivirus actions based on policies indicated on the policy list 234. The policy list 234 may comprise computer-readable data that indicate what to do in the event the network 120 has been exposed to a virus. In one embodiment, the policy list 234 allows the network administrator to select from the following antivirus actions in the event the network 120 has been exposed to a virus:

a) e-mail a human-readable form of the vulnerability assessment report to the network administrator;

b) send an e-mail notification to the network administrator about the virus;

c) send an e-mail notification to a user of a client computer 122 that has received an e-mail carrying the virus;

d) automatically disinfect a client computer 122 that has received an e-mail carrying the virus (only the infected e-mail or the entire client computer 122);

e) all or any combination of the antivirus actions (a)-(d).

In one embodiment, the enforcement module 233 performs the antivirus action of automatically disinfecting a client computer 122 infected by a virus by sending a command to an antivirus agent 224 to scan selected infected e-mails or the entire client computer 122 using an antivirus scan engine 222. The antivirus agent 224 may communicate with components of the antivirus manager 230 using any appropriate communication protocol without detracting from the merits of the present invention.

A client computer 122 may include a mail client 221, an antivirus scan engine 222, an antivirus pattern file 223, and an antivirus agent 224. In the example of FIG. 2, only the client computer 122A is illustrated as having the aforementioned components for clarity of illustration. It is to be noted that the client computers 122B, 122C, etc. may have the same components as the client computer 122A. Furthermore, the components of a client computer 122 are shown in FIG. 2 as separate components for illustration purposes. As can be appreciated, the aforementioned components may also be integrated together. For example, the antivirus agent 224 and the antivirus scan engine 222 may be integrated together in a single software module.

The mail client 221 may comprise commercially available e-mail software, such as the Microsoft Outlook™ software. The antivirus scan engine 222 may comprise computer-readable program code for scanning a computer for viruses. Virus scanning, in general, is well known in the art and not further discussed here. Antivirus scan engines are commercially available from various vendors including Trend Micro, Incorporated. The pattern file 223 may include the signatures and characteristics of known viruses, as well as information for identifying and removing the viruses. The pattern file 223 may be periodically updated to keep up with newly discovered viruses. The antivirus scan engine 222 uses the pattern file 223 to scan a client computer 122 for viruses.

Figure 3:
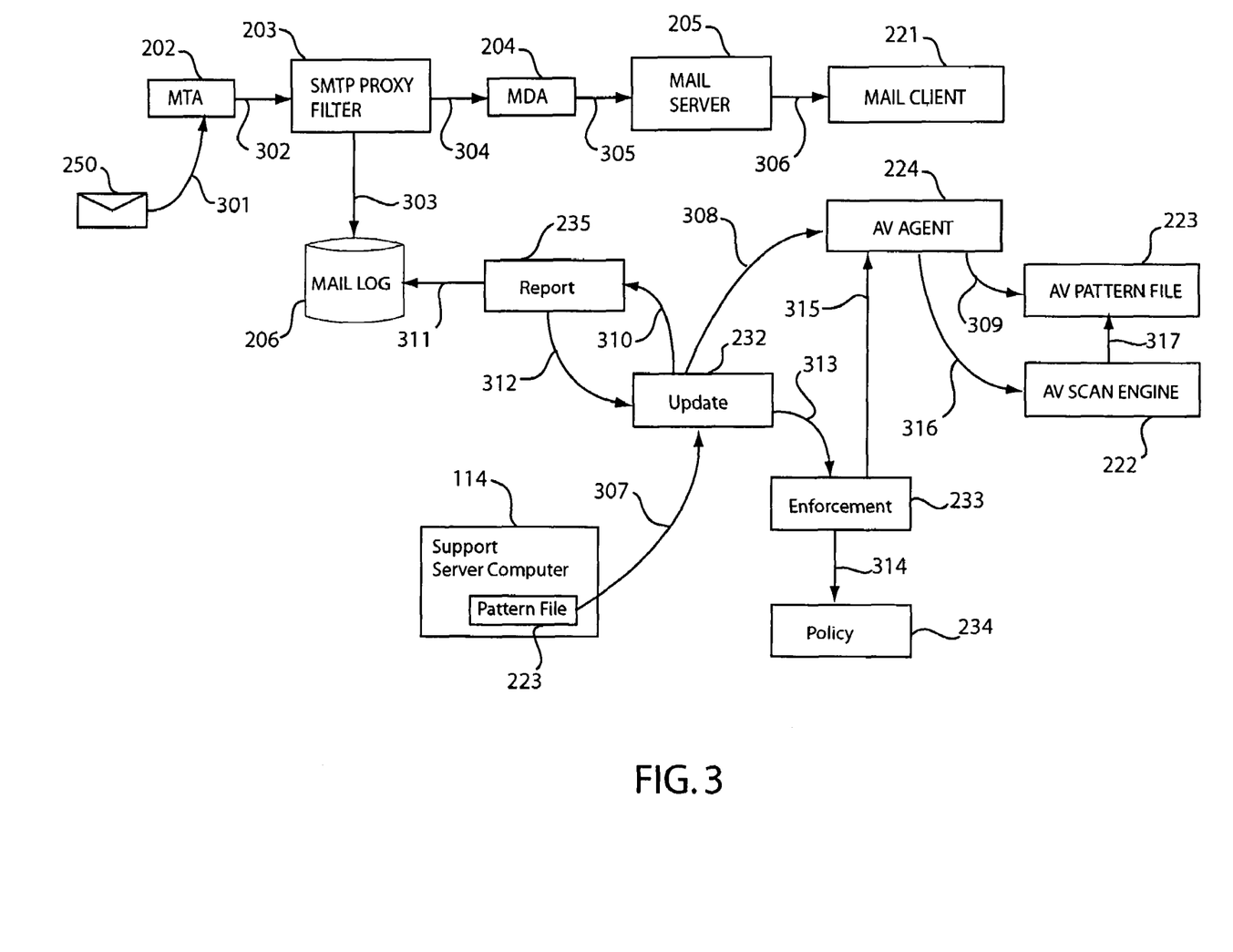
FIG. 3 shows a flow diagram of a method of automatically securing a computer network from viruses in accordance with an embodiment of the present invention.

Referring now to FIG. 3, there is shown a flow diagram of a method of automatically securing a computer network from computer viruses in accordance with an embodiment of the present invention. The method of FIG. 3 will be described using the components shown in FIGS. 1 and 2 for illustration purposes, not as a limitation. In the example of FIG. 3, an e-mail 250 is received by the mail transfer agent 202 (see arrow 301). The e-mail 250 may be an incoming e-mail from a computer outside the network 120. The mail transfer agent 202 forwards the e-mail 250 to the proxy filter 203 (see arrow 302), which parses the e-mail 250 to create a corresponding e-mail record. The proxy filter 203 logs the e-mail 250 by saving the e-mail record in the mail log 206 (see arrow 303). Thereafter, the proxy filter 203 forwards the e-mail 250 to the mail delivery agent 204 (see arrow 304), which forwards the e-mail 250 to the mail server 205 (see arrow 305). The mail server 205 initiates delivery of the e-mail 250 to the recipient e-mail client 221 of the client computer 122 (see arrow 306). The just described actions performed for the e-mail 250 may be performed for all e-mails received by the mail transfer agent 202. This advantageously allows the proxy filter 203 to build a comprehensive mail log 206 having e-mail records for each received e-mail.

The support server computer 114 may periodically send an updated pattern file 223 (see arrow 307) for use by antivirus scan engines 222 in the network 120. An updated pattern file 223 is a replacement for copies of an old pattern file in client computers 122. The update module 232 receives the updated pattern file 223 and provides copies to client computers 122 by way of corresponding antivirus agents 224 (see arrow 308). In each client computer 122, an antivirus agent 224 replaces the old pattern file with the updated pattern file 223 (see arrow 309).

Advantageously, the receipt of an updated pattern file 223 automatically triggers the update module 232 to check if the network 120 has been exposed to a new virus. In one embodiment, the update module 232 determines if the updated pattern file 223 identifies a new virus not identified in the old pattern file. If so, the network 120 may have been exposed to the new virus and was especially vulnerable to the new virus because the scan engines 222 didn't have the requisite pattern file to identify and remove it. In that case, the update module 232 automatically initiates generation of a vulnerability assessment report by sending the appropriate command to the report module 235 (see arrow 310). The report module 235 checks e-mail records in the mail log 206 (see arrow 311) to determine if an e-mail having characteristics of an infected e-mail (e.g., has the same subject line as infected e-mails) or a suspicious file attachment (e.g., attached file with a file name similar to that of the virus or a file carrying the virus) has been received in the network 120. The report module 235 generates a vulnerability assessment report indicating the source and destination addresses of e-mails that may have been carrying the virus and other information from records of those e-mails. The report module 235 provides the vulnerability assessment report (see arrow 312) to the update module 232. In one embodiment, the update module 232 passes the vulnerability assessment report to the enforcement module 233 (see arrow 313), including the addresses of client computers 122 that may have received infected e-mails.

The enforcement module 233 performs antivirus actions based on information in the policy list 234 (see arrow 314). For example, a policy may be to automatically perform antivirus scanning on client computers 122 that have received an infected e-mail. In that case, the enforcement module 233 sends a command to the antivirus agent 224 (see arrow 315) of client computers 122 that have received an infected e-mail to remotely initiate antivirus scanning. The command may be for scanning of the infected e-mails only (for fast response) or the entirety of an infected client computer 122. In response, the antivirus agent 224 sends a command to a corresponding antivirus scan engine 222 (see arrow 316) to scan the infected e-mails in or the entirety, depending on the policy, of the client computer 122 for viruses using the updated pattern file 223 (see arrow 317) and remove or clean infected files.

As can be appreciated, embodiments of the present invention allow for automatic vulnerability tracking by logging in-transit e-mails, generation of vulnerability assessment reports, and initiation of antivirus actions. Without the embodiments of the present invention, a network administrator may have to manually go through various logs at different nodes of the network and correlate threat exposure by extrapolation in the event of a virus outbreak. Worse, a network administrator may have to arrange for scanning of all computers in the network even though only a few may have been infected. This wastes computer time and may not be feasible as some users may or may not initiate virus scanning and most antivirus software automatically perform virus scanning based on frequency (e.g., once a month), not need. Embodiments of the present invention advantageously allow for automatic response to a new virus, which is triggered by receipt of a new pattern file. The response is relatively fast as it concentrates first on computers that may have been infected with the new virus and can focus scanning on specific e-mails determined to be carrying the virus. Even if the new virus has not entered the network, embodiments of the present invention give the network administrator peace of mind that his or her network has not been exposed to the new virus.

Figure 4:
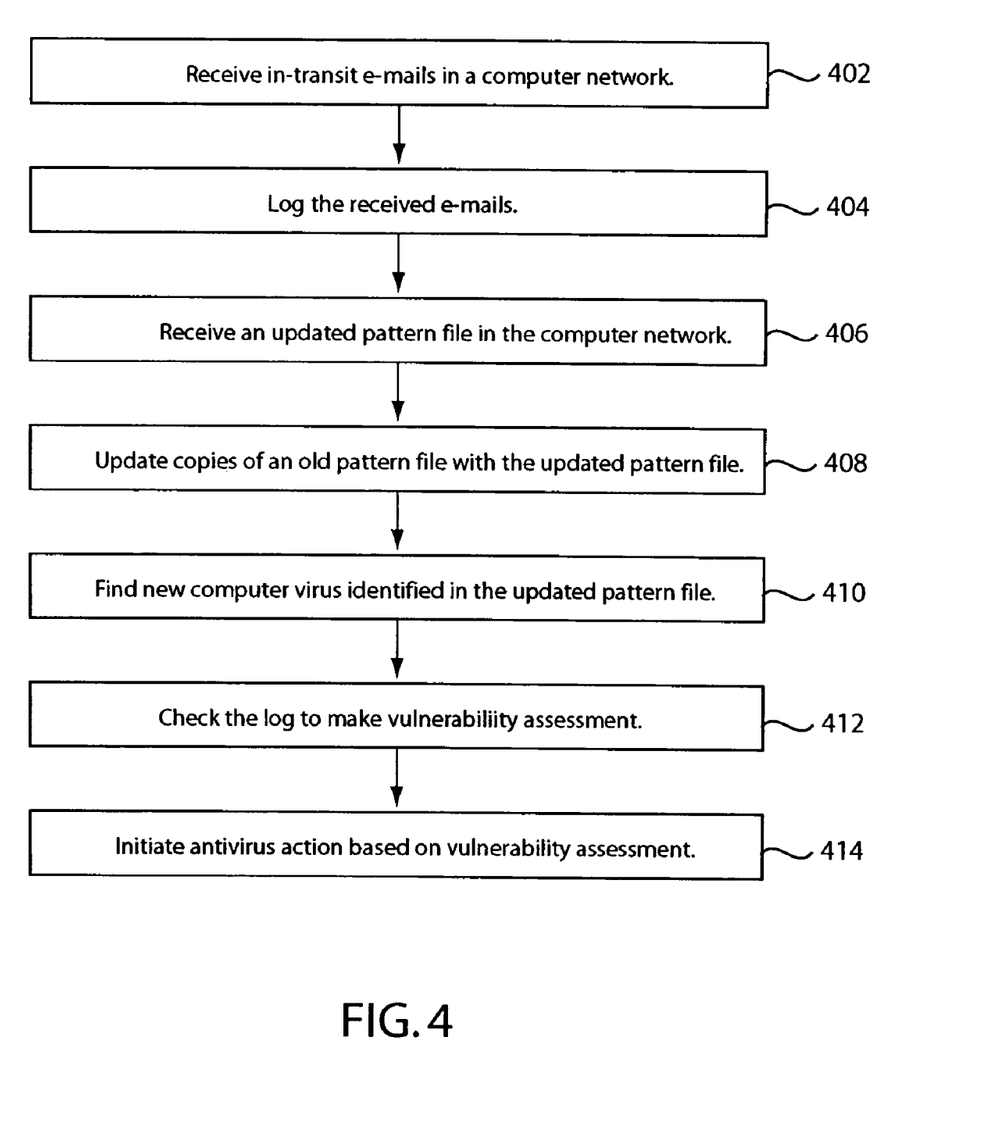
FIG. 4 shows a flow chart of a method of automatically securing a network from viruses in accordance with an embodiment of the present invention.

FIG. 4 shows a flow chart of a method of automatically securing a computer network from computer viruses in accordance with an embodiment of the present invention. In step 402, in-transit e-mails are received in a private computer network. In step 404, the receipt of each e-mail is recorded in a mail log. In one embodiment, step 404 is performed by parsing each e-mail for the name of recipient, network address of recipient, name of sender, network address of sender, file name (including extension) of attached files, and headers of attached files. In step 406, an updated pattern file for an antivirus scan engine is received in the network. Step 406 may be performed by having a mail server computer (or another server computer) in the network receive updated pattern file from a remote server computer. In step 408, copies of the old pattern file in a plurality of client computers in the network are replaced with the updated pattern file. For example, an update module in the mail server computer may initiate updating of old pattern files in the network with the updated pattern file. In step 410, the updated pattern file is checked for new viruses not identified in the old pattern file. In step 412, a vulnerability assessment is automatically performed if the updated pattern file identifies a new virus. The vulnerability assessment provides information on how much of the network has been exposed to the new virus, if any. The vulnerability assessment may be performed by querying the mail log to identify e-mails that have characteristics or attached file indicative of the new virus (e.g. using information from the updated pattern file). In step 414, an antivirus action is automatically initiated in the event the vulnerability assessment indicates that the network has been exposed to the new virus. For example, automated virus scanning of a client computer may be performed if the vulnerability assessment indicates that the client computer has received an infected e-mail. The virus scanning of the client computer may be remotely initiated from the mail server computer and may be performed only on specific e-mails determined to be carrying the virus or the entirety of the client computer.

Figure 5:
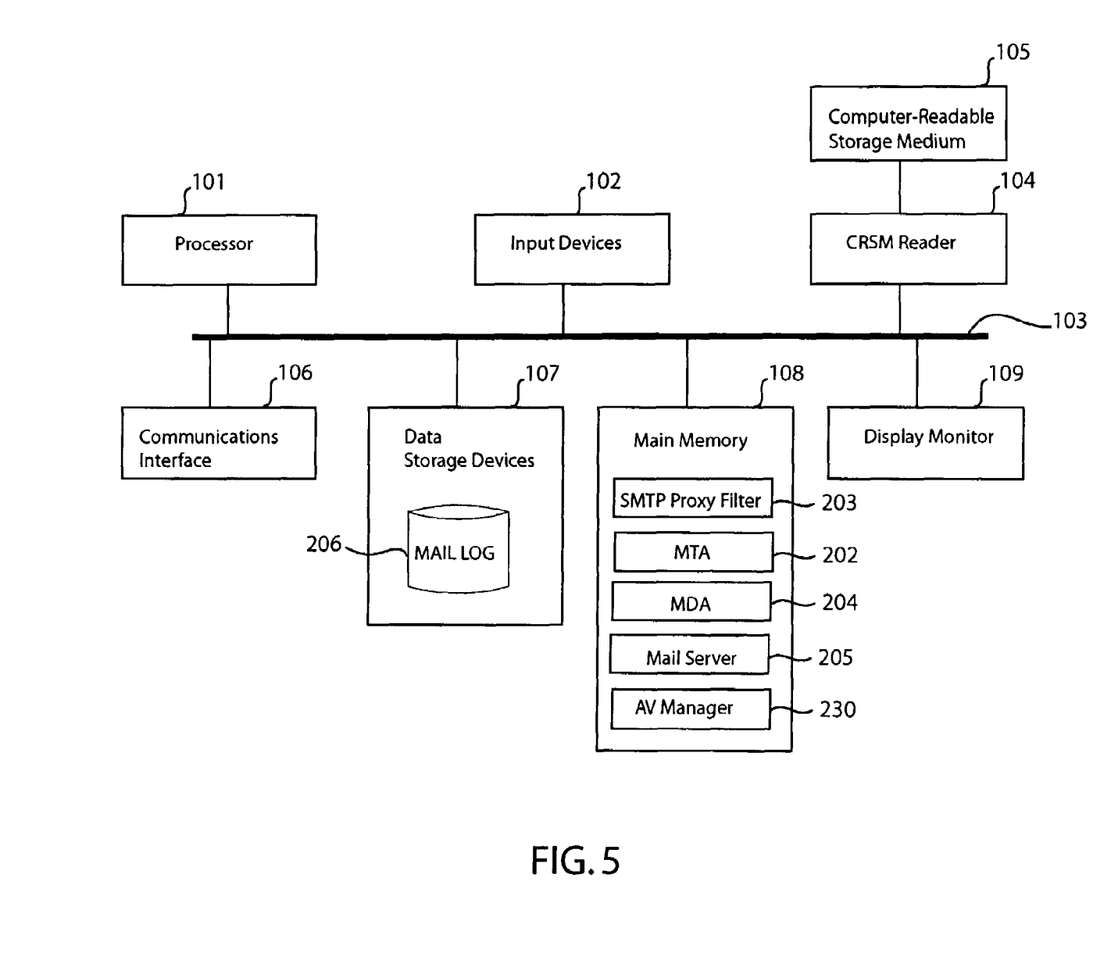
FIG. 5 schematically shows an example computer that may be used in embodiments of the present invention.

Referring now to FIG. 5, there is schematically shown an example computer that may be used in embodiments of the present invention. Depending on its configuration, the computer shown in the example of FIG. 5 may be employed as a client computer, a server computer, or an appliance, for example. The computer of FIG. 5 may have less or more components to meet the needs of a particular application. As shown in FIG. 5, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106.

In the example of FIG. 5, the computer has been configured as a mail server computer 125. The main memory 108 thus contains the previously described SMTP proxy filter 203, the mail transfer agent 202, the mail delivery agent 204, the mail server 205, and the antivirus manager 230. Components in the main memory 108 may be executed by the processor 101. A data storage device 107 may store the mail log 206.

Although the above-described embodiments pertain to e-mails, they may also be adapted for other data transfer applications including file transfers using the File Transfer Protocol (FTP) or web browsing using the hyper-text transfer protocol (HTTP), for example. In the case of FTP, an FTP server may log information about each file being transferred. Information about each file being transferred may be stored as a record in a file log, similar to the mail log 206. The file log may have minimum essential information to identify each file's name, header information, destination and origination computers and other non-storage intensive information. Upon receipt of an updated pattern file, an antivirus manager may check the file log if any file having the characteristics of a new virus identified in the updated pattern file has been transferred in or out of the network. If so, antivirus actions may be automatically initiated by the antivirus manager as in the above-described embodiments.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of automatically securing a computer network against computer viruses, the method to be performed by a computer and comprising:
   receiving a plurality of e-mails in the computer network, the computer network including a first server computer and a plurality of client computers;
   logging receiving of the plurality of e-mails in a log;
   receiving in the first server computer an updated pattern file for an antivirus scan engine, the updated pattern file being received by the first server computer from a remote second server computer, the updated pattern file being an update for an old pattern file present in the plurality of client computers;
   updating copies of the old pattern file in the plurality of client computers;
   finding a new computer virus identified in the updated pattern file but not in the old pattern file; and
   in response to receiving the updated pattern file in the first server computer, checking the log to determine vulnerability of the computer network to the new computer virus by identifying from the log an e-mail that has been forwarded to its destination client computer and carrying the new computer virus.

2. The method of claim 1 wherein checking the log to determine vulnerability of the computer network to the new computer virus comprises:
   checking the log to determine if the new computer virus has been received in a first client computer in the plurality of client computers.

3. The method of claim 2 further comprising:
   initiating antivirus actions for the first client computer.

4. The method of claim 3 wherein initiating antivirus action for the first client computer comprises:
   remotely initiating scanning of a specifically identified e-mail in the first client computer for computer viruses using the updated pattern file.

5. The method of claim 3 wherein initiating antivirus action for the first client computer comprises:
   sending a notification to an administrator of the computer network about the first client computer.

6. The method of claim 3 wherein initiating antivirus action for the first client computer comprises:
   remotely initiating scanning of the first client computer for computer viruses using the updated pattern file.

7. The method of claim 3 wherein initiating antivirus action for the first client computer comprises:
   sending a notification to a user of the first client computer.

8. The method of claim 7 wherein the notification is by e-mail.

9. The method of claim 1 wherein logging the receiving of the e-mails comprises:
   extracting address, subject, and attached file information from each e-mail in the plurality of e-mails.

10. The method of claim 9 wherein the file information comprises a file name.

11. The method of claim 1 wherein checking the log to determine vulnerability of the computer network to the new computer virus comprises:
    checking the log to determine if the new computer virus has been forwarded to another computer outside the computer network.

12. A system for securing a computer network against computer viruses, the system comprising:
    a mail log containing information about in-transit e-mails in a computer network;
    an antivirus manager running in a server computer in the computer network, the antivirus manager being configured to check the mail log to determine if an e-mail has been forwarded to its destination client computer in the computer network and carrying a new computer virus identified in an updated pattern file; and
    an antivirus agent running in the client computer in the computer network, the antivirus agent being configured to receive a command from the antivirus manager to initiate virus scanning in the client computer if the antivirus manager determines that the new computer virus has been received in the client computer.

13. The system of claim 12 wherein the mail log comprises:
    a plurality of e-mail records having address information for each of the in-transit e-mails.

14. The system of claim 12 wherein the antivirus manager comprises:
    an update module configured to receive updated files from a support server computer located outside the computer network; and
    a report module configured to generate a validity assessment report containing information about exposure of the computer network to the new computer virus.

15. The system of claim 14 wherein the antivirus manager further comprises:
    a policy list comprising information on what to do in the event the computer network has been exposed to a computer virus; and
    an enforcement module configured to perform antivirus actions based on the policy list.

16. A method of automatically securing a computer network against computer viruses, the method comprising:
    receiving a plurality of files in a server computer in a computer network, the computer network including a plurality of client computers;
    logging receipt of the files in a log;
    receiving an updated pattern file for pattern files of antivirus scan engines in the plurality of client computers;
    updating the pattern files for the antivirus scan engines in the plurality of client computers;
    in response to receiving the updated pattern file in the server computer, checking the log to determine if a file in the plurality of files contains a computer virus;
    identifying a client computer in the plurality of client computers that has received a file that includes the computer virus; and
    remotely initiating antivirus scanning of the client computer.

17. The method of claim 16 wherein the plurality of files are attachments to corresponding in-transit e-mails.

18. The method of claim 16 wherein the log comprises a log of e-mails.

19. The method of claim 16 wherein the updated pattern file is received from a computer outside the computer network.

* * * * *